(12) United States Patent
Martini et al.

(10) Patent No.: US 10,808,717 B2
(45) Date of Patent: Oct. 20, 2020

(54) COOLING TOWERS AXIAL FAN IN A HOLLOWED DISC/RING CONFIGURATION

(71) Applicant: Evapco, Inc., Taneytown, MD (US)

(72) Inventors: Luigi Martini, Itú-SP (BR); Daniel Strauss, Itú-SP (BR); Ricardo de Araujo Pereira Andrade, Itú-SP (BR)

(73) Assignee: Evapco, Inc., Taneytown, MD (US)

( * ) Notice: Subject to any disclaimer, the term of this patent is extended or adjusted under 35 U.S.C. 154(b) by 22 days.

(21) Appl. No.: 15/959,998

(22) Filed: Apr. 23, 2018

(65) Prior Publication Data
US 2019/0120246 A1 Apr. 25, 2019

Related U.S. Application Data
(60) Provisional application No. 62/488,303, filed on Apr. 21, 2017.

(51) Int. Cl.
| F04D 29/32 | (2006.01) |
| F04D 19/00 | (2006.01) |
| F04D 29/34 | (2006.01) |
| F04D 29/38 | (2006.01) |

(52) U.S. Cl.
CPC ......... F04D 29/329 (2013.01); F04D 19/002 (2013.01); F04D 29/34 (2013.01); F04D 29/38 (2013.01); F05D 2250/291 (2013.01); F05D 2260/31 (2013.01)

(58) Field of Classification Search
CPC ...... F04D 29/326; F04D 29/329; F04D 29/38; F04D 29/34; F04D 19/002; F05D 2260/31; F05D 2260/96; F05D 2250/291
See application file for complete search history.

(56) References Cited

U.S. PATENT DOCUMENTS

| 2,072,322 | A | * | 3/1937 | Upson | ..................... B64C 11/16 |
| | | | | | 416/204 R |
| 2,563,020 | A | * | 8/1951 | Gemeinhardt | ......... A63H 27/02 |
| | | | | | 416/208 |
| 3,161,239 | A | * | 12/1964 | Andersen | ................ F04D 29/34 |
| | | | | | 416/208 |
| 4,003,677 | A | * | 1/1977 | Parkes | .................... F04D 29/34 |
| | | | | | 416/208 |
| 4,046,488 | A | * | 9/1977 | Wickham | .............. F04D 29/388 |
| | | | | | 416/210 R |

(Continued)

FOREIGN PATENT DOCUMENTS

| CN | 205207259 | 5/2016 |
| DE | 19531160 | 2/1997 |

(Continued)

OTHER PUBLICATIONS

International Search Report issued in co-pending International Application No. PCT/US2018/028884 dated Aug. 1, 2018.

*Primary Examiner* — David E Sosnowski
*Assistant Examiner* — Wayne A Lambert
(74) *Attorney, Agent, or Firm* — Whiteford, Taylor & Preston, LLP; Peter J. Davis

(57) ABSTRACT

A cooling tower fan hub having a ring and a disc in which in which hollows and recesses are opened in the ring and/or in the disc in order to decrease fan natural frequencies and avoid excitation by the several kind of loads that affect a fan during operation. The number, size and shape of the hollows can be adjusted to tune the fan natural frequencies around the original value.

6 Claims, 6 Drawing Sheets

(56) References Cited

U.S. PATENT DOCUMENTS

| | | | |
|---|---|---|---|
| 4,088,423 A | | 5/1978 | Dulin et al. |
| 4,321,013 A | * | 3/1982 | Schwarz ............... B64C 27/32 |
| | | | 416/134 A |
| 4,521,157 A | * | 6/1985 | Caramaschi ........... B64C 27/32 |
| | | | 416/134 A |
| 4,611,972 A | * | 9/1986 | Andrae .................. B64C 11/04 |
| | | | 403/14 |
| 4,957,414 A | * | 9/1990 | Willingham ....... B29C 45/0025 |
| | | | 416/134 R |
| 5,927,945 A | * | 7/1999 | Chen ..................... F01D 5/3069 |
| | | | 416/210 R |
| 6,139,277 A | * | 10/2000 | Lopatinsky ........... F01D 5/3015 |
| | | | 416/220 A |
| 6,244,821 B1 | * | 6/2001 | Boyd ................... F04D 25/088 |
| | | | 416/210 R |
| 7,331,764 B1 | * | 2/2008 | Reynolds ............. F04D 29/023 |
| | | | 416/204 R |
| D607,988 S | * | 1/2010 | Oleson ........................ D23/377 |
| 8,579,588 B1 | * | 11/2013 | Boyd ..................... F04D 29/34 |
| | | | 416/204 R |
| 8,721,305 B2 | * | 5/2014 | Oleson ................. F04D 25/088 |
| | | | 417/423.1 |
| 9,523,371 B2 | * | 12/2016 | Hollan .................. F04D 29/329 |
| 9,874,214 B2 | * | 1/2018 | Whitley ............... F04D 19/002 |
| 2008/0031726 A1 | | 2/2008 | Bernardus Olthof et al. |
| 2011/0262278 A1 | * | 10/2011 | Fizer .................... F04D 25/088 |
| | | | 416/220 R |
| 2013/0323072 A1 | * | 12/2013 | Aschermann ......... F04D 25/022 |
| | | | 416/234 |
| 2015/0211532 A1 | | 7/2015 | Whitley |
| 2016/0290357 A1 | * | 10/2016 | Whitley ................ F04D 29/388 |
| 2017/0037870 A1 | * | 2/2017 | Cahill ................... F04D 29/329 |
| 2018/0112675 A1 | | 4/2018 | Neff et al. |
| 2018/0156230 A1 | * | 6/2018 | Kennedy .............. F04D 29/329 |
| 2018/0306208 A1 | * | 10/2018 | Gabbin ................. F04D 29/663 |

FOREIGN PATENT DOCUMENTS

| | | | | |
|---|---|---|---|---|
| GB | 853331 A | * | 11/1960 | ............. F01D 5/021 |
| GB | 1511732 A | * | 5/1978 | ............. F04D 29/36 |
| GB | 2280225 | | 1/1995 | |
| GB | 2390647 A | * | 1/2004 | ........... F04D 29/329 |

\* cited by examiner

COOLING TOWERS AXIAL FAN IN A HOLLOWED DISC/RING CONFIGURATION

BACKGROUND OF THE INVENTION

Field of the Invention

The present invention relates to cooling tower fans.

SUMMARY OF THE INVENTION

The present invention relates to cooling tower axial fans, the diameters of which typically range between 60 and 156 inches. The fans typically have a central boss, a hub and some blades evenly distributed. A common issue for these fans is high vibration and even structural failure at particular rotation frequencies/rotation speeds (called "lock-out rotations") in which the fan cannot operate for a long period. That is, with the use of variable frequency drives, the rotational velocity of the fan can be increased between 0 RPM and its nominal value. At certain frequencies, an eventual resonance can cause high displacements and strong stresses into the several parts that constitute the fan. Generally the final result of a resonance is fatigue failure of the component.

This invention came from a desire on the part of the inventors for a cooling tower that has no lock out rotations. According to an object of the invention, a cooling tower fan will operate with an acceptable (defined by the client) vibration level across the entire range of rotation speeds 0 RPM and its nominal rotation or maximum safe rotation speed).

This invention is a hub for cooling tower fans constituted by a Disc, bolted to the central boss, in which hollows and recesses are opened (through laser or water cut) in order to decrease fan natural frequencies and avoid excitation by the several kind of loads that affect a fan during operation. The number, size and shape of the hollows can be adjusted to tune the fan natural frequencies around the original value. The invention includes a configuration according to which the hollows and recesses "collapse" one into other resulting in a star-shaped rotor. According to a further embodiment, the rotor can be constituted only by hollows without recesses. The Ring may be modified similarly, in which only recesses can be applied. The recesses in the Ring can have the same or opposite concavity direction of the corresponding recesses into the Disc. In every configuration presented, a seal disc is provided in order to avoid flow return.

Accordingly, there is provided according to the invention, A cooling tower axial fan hub including a first disc configured to connect to a central boss; a second disc bolted to the first disc through connecting elements of a plurality of fan blades, said connecting elements sandwiched between the first disc and the second disc; a seal disc attached to said second disc to inhibit flow return; in which the first disc is an annular outer ring attached to an inner ring via a plurality of spokes, in which the spokes define a plurality of hollow spaces in said first disc, said inner ring configured to connect to said central boss; in which the second disc consists only of 4 an annular ring having an inner diameter and an outer diameter, and in which the annular ring outer diameter is substantially equal to an outer diameter of the first disc annular outer ring. (FIGS. 1-4).

There is also provided according to the invention a cooling tower axial fan hub in which the first and second discs have constant outer diameters having outer perimeter edges with no indentations or recesses. (FIG. 2)

There is also provided according to the invention a cooling tower axial fan hub in which the second disc annular ring has a constant inner diameter has an inner perimeter edge with no indentations or recesses (FIG. 3).

There is also provided according to the invention a cooling tower axial fan hub in which the first disc has an outer perimeter edge having regularly spaced indentations. (FIGS. 1 and 2).

There is also provided according to the invention a cooling tower axial fan hub in which the second disc consists only of an annular ring having a constant outer diameter, an outer perimeter edge with no indentations or recesses, and an inner perimeter edge having regularly spaced indentations. (FIGS. 1 and 2).

There is also provided according to the invention, a cooling tower axial fan hub having a first star-shaped disc configured to connect to a central boss; a second star-shaped disc bolted to the first disc through connecting elements of a plurality of fan blades, wherein the connecting elements are sandwiched between the first disc and the second disc; a seal disc attached to the second disc to inhibit flow return; in which the first and second discs are characterized by a plurality of corresponding and regularly spaced fan blade connecting segments/spokes, first disc segments/spokes extending distally an equal distance from a central boss connection, and said second disc segments/spokes extending distally an equal distance from an open center core, each pair of adjacent spokes defining a V-shaped space there-between. (FIGS. 5 and 6).

DETAILED DESCRIPTION

Figure 1:
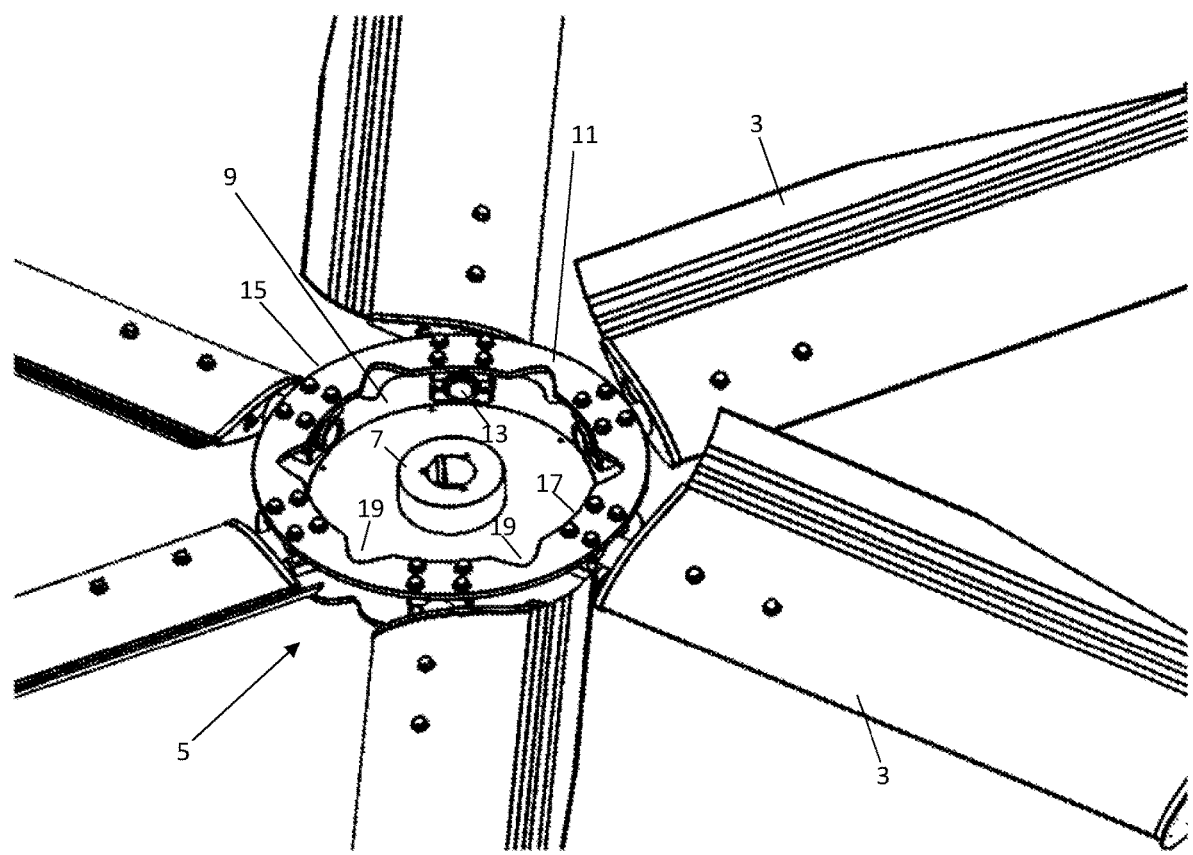
FIG. 1 shows a perspective view of a top side of a first embodiment of the invention.
Figure 2:
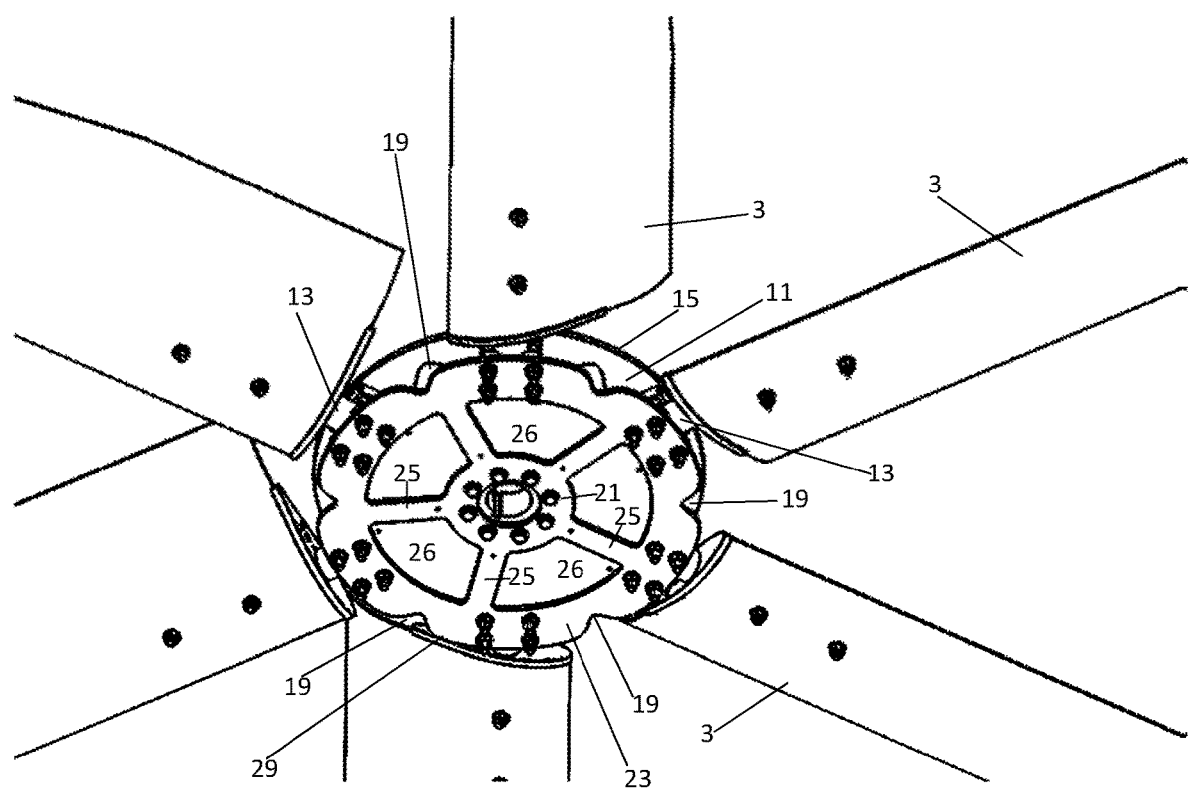
FIG. 2 shows a perspective view of a bottom side of a first embodiment of the invention.

FIGS. 1 and 2 show a cooling tower fan having blades 3 connected to hub 5, which in turn is connected to central boss 7. Hub 5 includes disc 9 which is preferably bolted to central boss 7, and ring 11. Connecting part 13 of blades 3 are attached to hub 5, preferably sandwiched between disc 9 and ring 11. Disc 9 and ring 11 are planar elements that are between 5/32 inches (4 mm) to 3/4 inches (19 mm) thick and between 20 inches (510 mm) and 72 inches (1830 mm) in diameter. The ring 11 is generally annular in shape, with a preferably circular outer perimeter 15 having a constant outer diameter and an inner perimeter 17 that is defined by recesses or indentations 19 that are regularly spaced around the inner perimeter 17. The inner perimeter 17 of the ring 11 defines an opening 18 that is free of any ring structure.

Disc 9 includes a central portion 21 configured to bolt to the central boss 7. The central portion 21 is connected to an outer annular portion 23 by a plurality of spokes 25. The disc outer annular portion 23 has a constant inner diameter which is interrupted by the spokes 25. The outer perimeter 29 of the annular portion 23 of disc 9 is generally circular in shape, but is characterized by recesses or indentations 19 that are regularly spaced around the outer perimeter 29 of the annular portion. The plurality of spokes 25 define hollows or open spaces 26 in the disc 9 which are free of any disc structure. As described above, the fan hub 5 (including ring 11 and disc 9) is connected to the central boss 7 at the central portion 21 of disc 9. Fan blades 3 are bolted between ring 11 and the outer annular portion 23 of disc 9. Seal disc 31 may be attached to ring 11 (see FIG. 3) to inhibit flow return.

Figure 3:
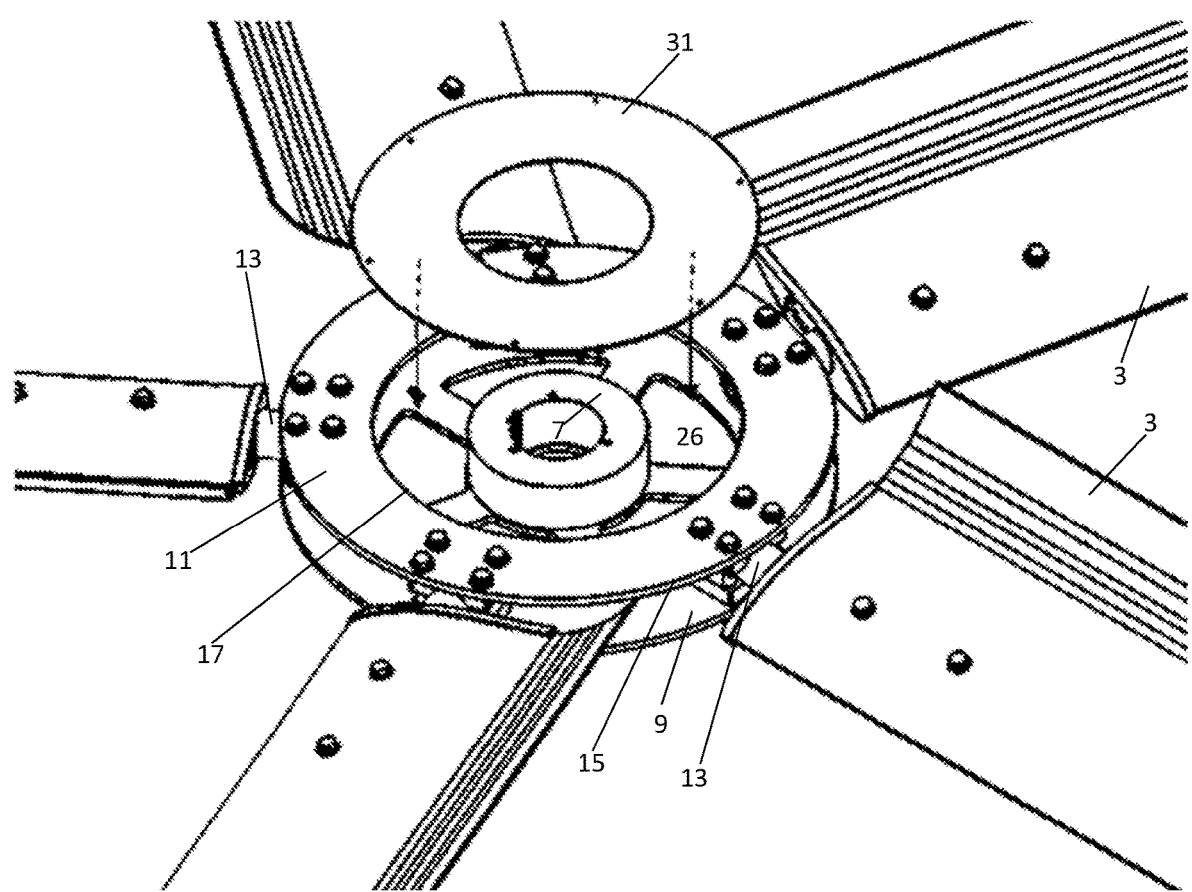
FIG. 3 shows a perspective view of a top side of a second embodiment of the invention.
Figure 4:
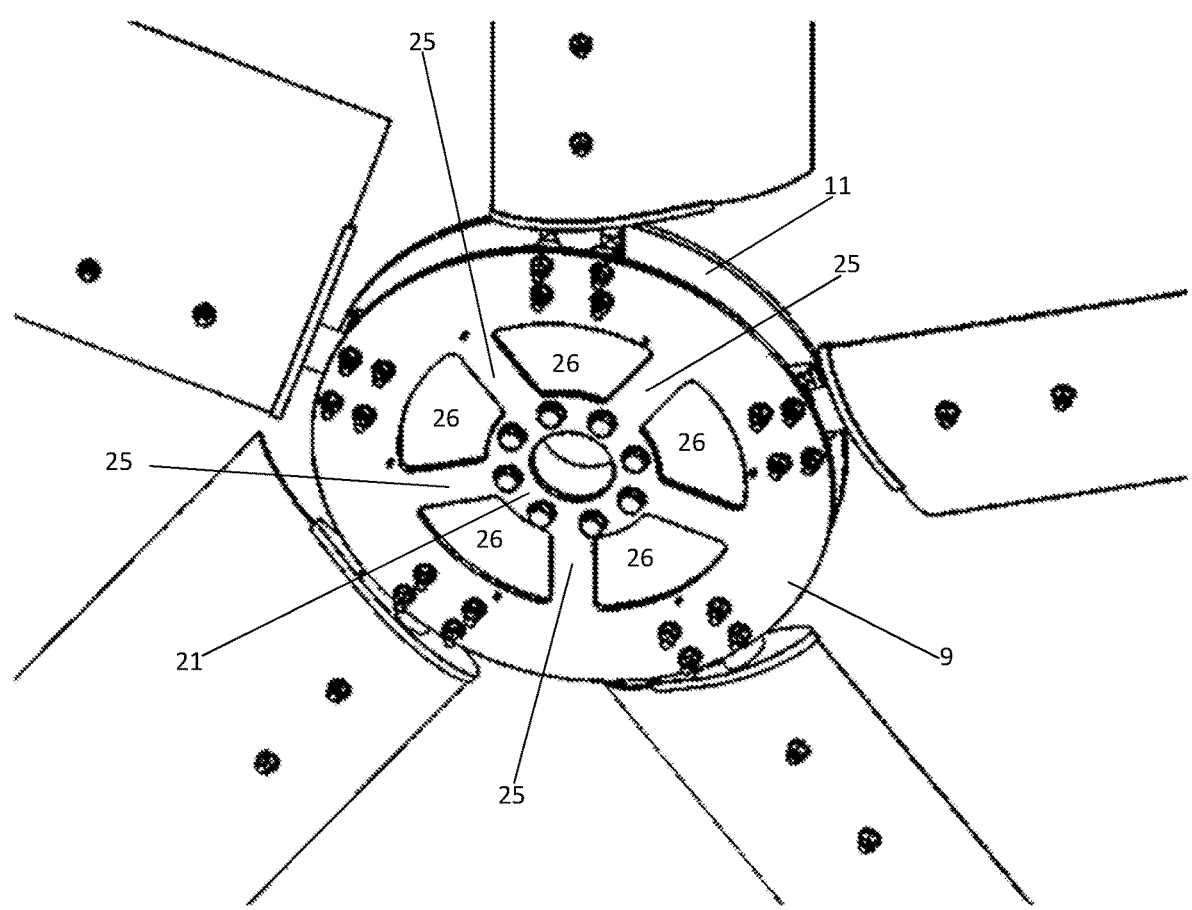
FIG. 4 shows a perspective view of a bottom side of a first embodiment of the invention.

A different embodiment is shown in FIGS. 3 and 4, in which the outer and inner perimeters of ring 11 (15 and 17, respectively) have constant diameters, i.e., are not characterized by recesses or indentations, and the outer perimeter 15 of annular portion of disc 9 likewise has a constant diameter and is not characterized by recesses or indentations. In other respects, the hub 5, including disc 9 and ring 11, is connected to the central boss 7 and the fan blades 3 in the same fashion as described with respect to FIGS. 1 and 2.

Figure 5:
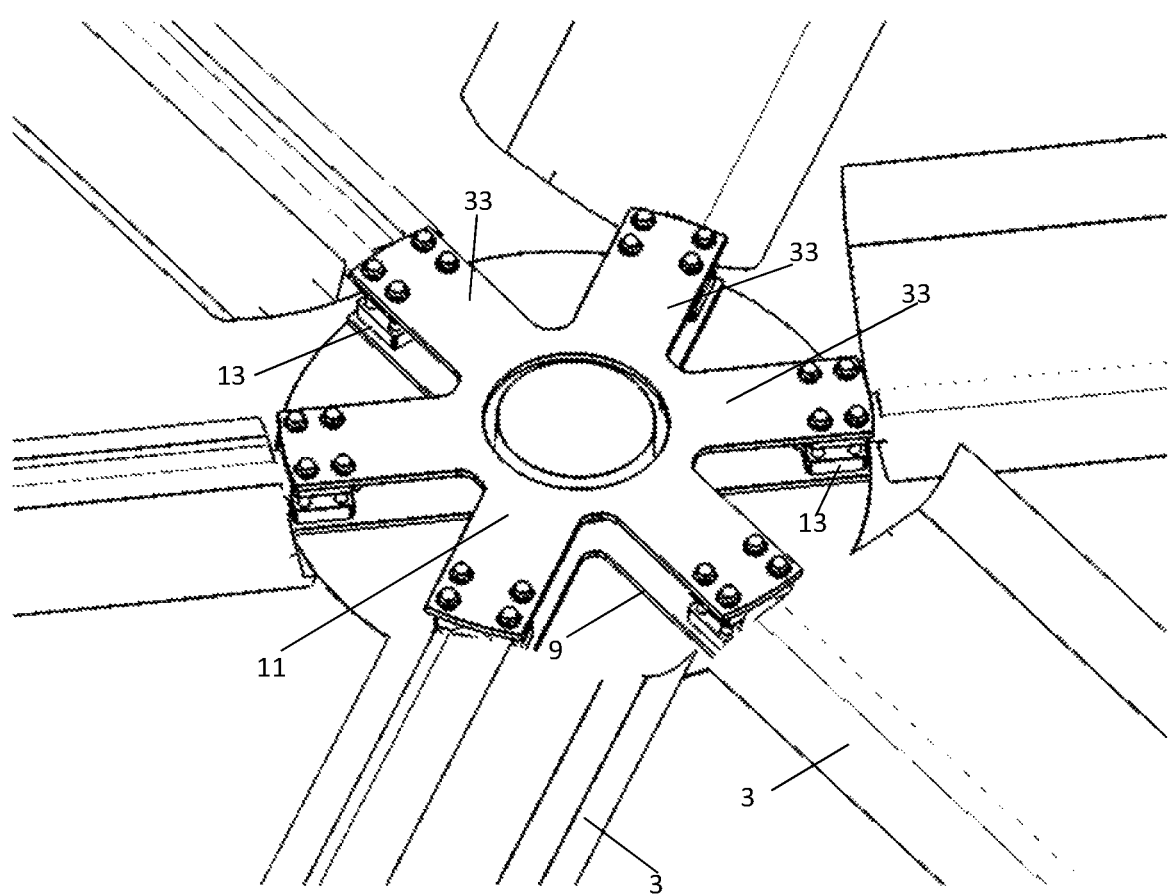
FIG. 5 shows a perspective view of a top side of a third embodiment of the invention.
Figure 6:
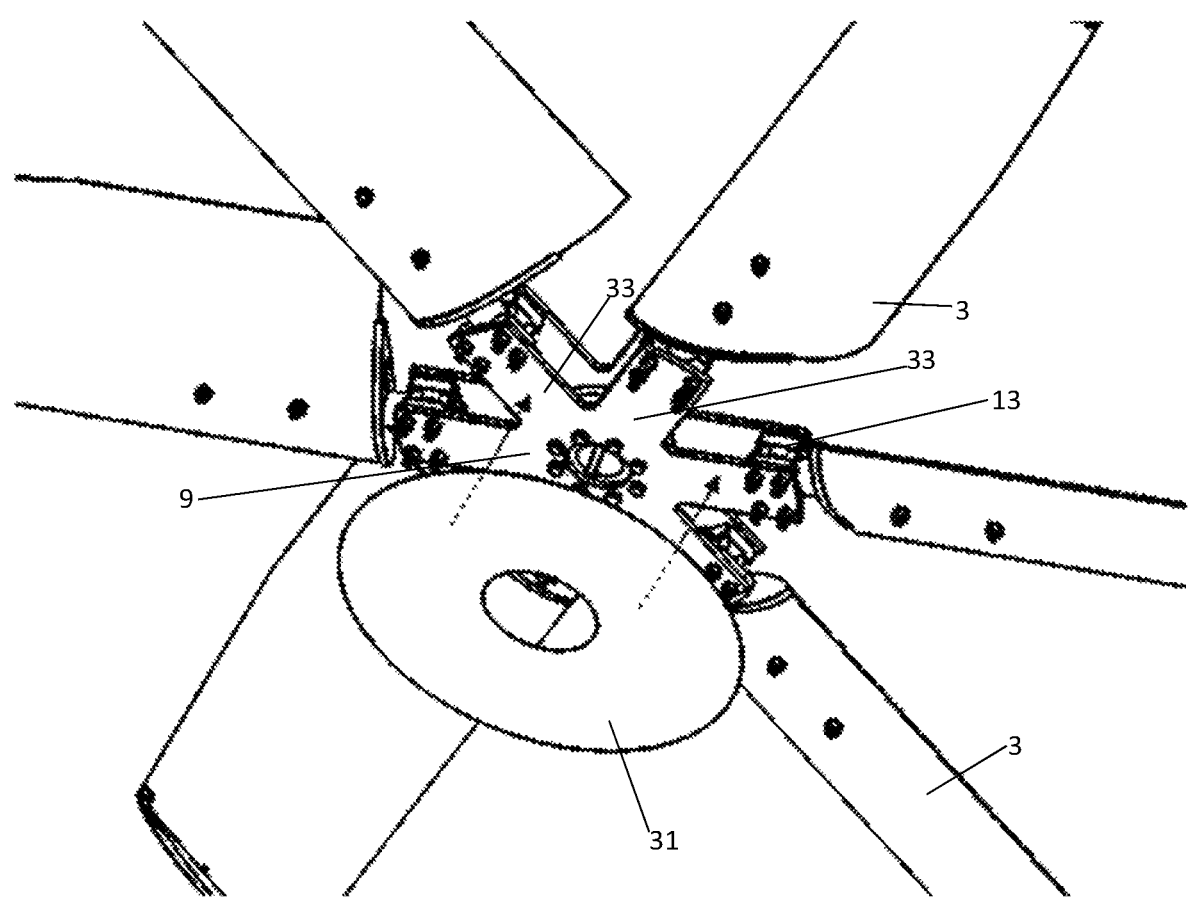
FIG. 6 shows a perspective view of a bottom side of a third embodiment of the invention.

FIGS. 5 and 6 show a fan hub 5 having star-shaped ring 11 and matching star-shaped disc 9. According to this embodiment, both ring 11 and disc 9 have a number of star spokes 33 corresponding to the number of attached fan blades. Neither of ring 11 or disc 9 have an annular outer ring. Instead, the distal portions of the spokes are connected to the fan blade connecting part 13. Disc 9 has a central portion configured to bolt to the central boss. Ring 11 defines a circular central opening 35. Seal disc 31 may be attached to the disc to prevent flow return as shown in FIG. 6.

The invention claimed is:

1. A cooling tower axial fan hub comprising:
    a first disc configured to connect to a central boss;
    a second disc bolted to said first disc through connecting elements of a plurality of fan blades, said connecting elements sandwiched between said first disc and said second disc;
    a seal disc comprising an annular ring having an outer diameter and an inner diameter attached to said second disc;
    said first disc comprising two concentric annular rings connected to one-another via a plurality of radially extending spokes, a central axis of each of said plurality of radially extending spokes extending along a radius of said first disc, wherein said spokes define a plurality of hollow spaces in said first disc, said two concentric annular rings comprising an annular outer ring and an annular inner ring, said annular inner ring configured to connect to said central boss;
    said second disc comprising only an annular ring having an inner diameter and an outer diameter, said annular ring of said seal disc dimensioned to cover an open area between said second disc annular ring inner diameter and said central boss.

2. A cooling tower axial fan hub according to claim 1, wherein said first and second discs have constant outer diameters having outer perimeter edges with no indentations or recesses.

3. A cooling tower axial fan hub according to claim 2, wherein said second disc annular ring has a constant inner diameter having an inner perimeter edge with no indentations or recesses.

4. A cooling tower axial fan hub according to claim 1, wherein said first disc has an outer perimeter edge having regularly spaced indentations.

5. A cooling tower axial fan hub according to claim 4, wherein said second disc comprising only the annular ring has a constant outer diameter and an outer perimeter edge with no indentations or recesses, and an inner perimeter edge having regularly spaced indentations.

6. A cooling tower axial fan hub comprising:
    a first disc configured to connect to a central boss;
    a second disc bolted to said first disc through connecting elements of a plurality of fan blades, said connecting elements sandwiched between said first disc and said second disc;
    a seal disc comprising an annular ring having an outer diameter and an inner diameter attached to said second disc;
    said first disc comprising a plurality of corresponding and regularly spaced first disc fan blade connecting segments, said second disc comprising a plurality of corresponding and regularly spaced second disc fan blade connecting segments, said first disc fan blade connecting segments each extending radially along a radius of said first disc, an equal distance from a central boss connection, and said first second disc fan blade connecting segments each extending radially, parallel with a radius of said second disc, an equal distance from an open center core, each pair of adjacent first disc fan blade connecting segments defining a V-shaped hollow space, and each pair of adjacent second disc fan blade connecting segments defining a V-shaped hollow space, said annular ring of said seal disc dimensioned to cover each said V-shaped hollow space defined by said each pair of second disc fan blade connecting segments.

* * * * *